US006990447B2

(12) United States Patent
Attias et al.

(10) Patent No.: US 6,990,447 B2
(45) Date of Patent: Jan. 24, 2006

(54) METHOD AND APPARATUS FOR DENOISING AND DEVERBERATION USING VARIATIONAL INFERENCE AND STRONG SPEECH MODELS

(75) Inventors: Hagai Attias, Seattle, WA (US); John Carlton Platt, Bellevue, WA (US); Li Deng, Redmond, WA (US); Alejandro Acero, Bellevue, WA (US)

(73) Assignee: Microsoft Corportion, Redmond, WA (US)

( * ) Notice: Subject to any disclaimer, the term of this patent is extended or adjusted under 35 U.S.C. 154(b) by 747 days.

(21) Appl. No.: 09/999,576

(22) Filed: Nov. 15, 2001

(65) Prior Publication Data

US 2003/0093269 A1 May 15, 2003

(51) Int. Cl.
*G10L 15/08* (2006.01)
*G10L 15/12* (2006.01)
*G10L 15/06* (2006.01)
*G10L 21/02* (2006.01)

(52) U.S. Cl. ........................ 704/240; 704/245; 704/226

(58) Field of Classification Search ................ 704/226, 704/228, 219, 251
See application file for complete search history.

(56) References Cited

U.S. PATENT DOCUMENTS

2002/0059065 A1 * 5/2002 Rajan ......................... 442/326

OTHER PUBLICATIONS

Vassilios V. Digalakis, Online Adaptation of Hidden Markov Models Using Incremental Estimation Algorithms, IEEE Transactions on Speech and Audio Processing, May 1999.*

D. Burshtein, Joint Maximum Likelihood Estimation of Pitch and AR Parameters using the EM Algorithm, IEEE ICASSP, 1990.*

Yunxin Zhao, Spectrum Estimation of Short-Time Stationary Signals in Additive Noise and Channel Distortion, IEEE Transactions on Signal Processing, Jul. 2001.*

Marc Fayolle and Jerome Idier, EM Parameter Estimation for a Piecewise AR, IEEE ICASSP 1997.*

Feder, Weinstein and Oppenheim, A new class of Sequential and Adaptive Algorithms with Application to Noise Cancellation, IEEE ICASSP, 1988.*

Lawrence, Variational Inference in Probabilistic Models, Cambridge University, PhD Thesis, Jan. 2000.*

U.S. Appl. No. 09/812,524, filed Mar. 20, 2001, Frey et al.

A.P. Varga and R.K. Moore, "Hidden Markov Model Decomposition of Speech and Noise," in Proceedings of the International Conference on Acoustics, Speech and Signal Processing, IEEE Press., pp. 845-848 (1990).

(Continued)

*Primary Examiner*—Susan McFadden
*Assistant Examiner*—Minerva Rivero
(74) *Attorney, Agent, or Firm*—Theodore M. Magee; Westman, Champlin & Kelly, P.A.

(57) ABSTRACT

A probability distribution for speech model parameters, such as auto-regression parameters, is used to identify a distribution of denoised values from a noisy signal. Under one embodiment, the probability distributions of the speech model parameters and the denoised values are adjusted to improve a variational inference so that the variational inference better approximates the joint probability of the speech model parameters and the denoised values given a noisy signal. In some embodiments, this improvement is performed during an expectation step in an expectation-maximization algorithm. The statistical model can also be used to identify an average spectrum for the clean signal and this average spectrum may be provided to a speech recognizer instead of the estimate of the clean signal.

36 Claims, 4 Drawing Sheets

OTHER PUBLICATIONS

S. Boll, "Suppression of Acoustic Noise in Speech Using Spectral Subtraction, " IEEE Transactions on Acoustics, Speech and Signal Processing, vol. 27, pp. 114-120 (1979).

L. Deng, A. Acero, M. Plumpe & X.D. Huang, "Large-Vocabulary Speech Recognition Under Adverse Acoustic Environments, " in Proceedings of the International Conference on Spoken Language Processing, pp. 806-809 (Oct. 2000).

A. Acero, L. Deng, T. Kristjansson and J. Zhang, "HMM Adaptation Using Vector Taylor Series for Noisy Speech Recognition, " in Proceedings of the International Conference on Spoken Language Processing, pp. 869-872 (Oct. 2000).

Y. Ephraim, "Statistical-Model-Based Speech Enhancement Systems, " Proc. IEEE, 80(10):1526-1555 (1992).

M.S. Brandstein, "On the Use of Explicit Speech Modeling in Microphone Array Application, " In Proc. ICASSP, pp. 3613-3616 (1998).

A. Dembo and O. Zeitouni, "Maximum A Posteriori Estimation of Time-Varying ARMA Processes from Noisy Observations," IEEE Trans. Acoustics, Speech and Signal Processing, 36(4):471-476 (1988).

P. Moreno, "Speech Recognition in Noisy Environments," Carnegie Mellon University, Pittsburgh, 9, PA, pp. 1-130 (1996).

B. Frey, "Variational Inference and Learning in Graphical Models," University of Illinois at urbana, 6 pages (updated).

Y. Ephraim and R. Gray, "A Unified Approach for Encoding Clean and Noisy Sources by Means of Waveform and Autoregressive Model Vector Quantization," IEEE Transactions on Information Theory, vol. 34, No. 4, pp. 826-834 (Jul. 1988).

R. Neal and G. Hinton, "A View of the EM Algorithm that Justifies Incremental, Sparse, and Other Variants," pp. 1-14 (updated).

J. Lim and A. Oppenheim, "All-Pole Modeling of Degraded Speech," IEEE Transactions on Acoustics, Speech, and Signal Processing, vol. ASSP-26, No. 3, pp. 197-210 (Jun. 1978).

Y. Ephraim, "A Bayesian Estimation Approach for Speech Enhancement Using Hidden Markov Models," IEEE Transactions on Signal Processing, vol. 40, No. 4, pp. 725-735 (Apr. 1992).

"Noise Reduction" downloaded from http://www.ind.rwth-aachen.de/research/noise_reduction.html, pp. 1-11 (Oct. 3, 2001).

A. Acero, "Acoustical and Environmental Robustness in Automatic Speech Recognition," Department of Electrical and Computer Engineering, pp. 1-141 (Sep. 13, 1990).

B. Frey et al., "Algonquin: Iterating Laplace's Method to Remove Multiple Types of Acoustic Distortion for Robust Speech Recognition," In Proceedings of Eurospeech, 4 pages (2001).

* cited by examiner

METHOD AND APPARATUS FOR DENOISING AND DEVERBERATION USING VARIATIONAL INFERENCE AND STRONG SPEECH MODELS

FIELD OF THE INVENTION

The present invention relates to speech enhancement and speech recognition. In particular, the present invention relates to denoising speech.

BACKGROUND OF THE INVENTION

In many applications, it is desirable to remove noise from a signal so that the signal is easier to recognize. For speech signals, such denoising can be used to enhance the speech signal so that it is easier for users to perceive. Alternatively, the denoising can be used to provide a cleaner signal to a speech recognizer.

In some systems, such denoising is performed in cepstral space. Cepstral space is defined by a set of cepstral coefficients that describe the spectral content of a frame of a signal. To generate a cepstral representation of a frame, the signal is sampled at several points within the frame. These samples are then converted to the frequency domain using a Fourier Transform, which produces a set of frequency-domain values. Each cepstral coefficient is then calculated as:

$$c_i = C\left[\ln\sum_k w_{ik} S_k\right] \quad \text{EQ. 1}$$

where $c_i$ is the ith cepstral coefficient, C is a transform, $w_{ik}$ is a filter associated with the ith coefficient and the kth frequency, and $S_k$ is the spectrum for the kth frequency, which is defined as:

$$S_k = |\hat{x}_k|^2 \quad \text{EQ. 2}$$

where $\hat{x}_k$ is an average sample value for the kth frequency.

To perform the denoising in cepstral space, models of clean speech and noise are built in cepstral space by converting clean speech training signals and noise training signals into sets of cepstral coefficient vectors. The vectors are then grouped together to form mixture components. Often, the distribution of vectors in each component is described using a Gaussian distribution that has a mean and a variance.

The resulting mixture of Gaussians for the clean speech signal represents a strong model of clean speech because it limits clean speech to particular values represented by the mixture components. Such strong models are thought to improve the denoising process because they allow more noise to be removed from a noisy speech signal in areas of cepstral space where clean speech is unlikely to have a value.

Although removing noise in the cepstral domain has proven effective, it is limiting in that only the resulting denoised signal can be applied directly to a speech recognition system. As such, removing noise in the cepstral domain does not facilitate providing something other than the denoised cepstral vectors to the recognizer.

In addition, denoising in the cepstral domain is more difficult than removing noise in the time domain or frequency domain. In the time or frequency domains, noise is additive, so noisy speech equals clean speech plus noise. In the cepstral domain, noisy speech is a complicated nonlinear function of clean speech and noise, and the required math becomes intractable and needs to be approximated. This is a separate complication that is independent of the complexity of the models used. Hence, time or frequency domain methods may in theory be able to provide a more accurate denoising since they would not require the approximation found in the cepstral domain.

To overcome these limitations, some systems have attempted to denoise speech signals in the time domain or the frequency domain. However, such denoising systems typically use simple models for the clean speech signal that do not incorporate much information on the structure of speech. As a result, it is difficult to discern noise from clean speech since the clean speech is allowed to take nearly any value.

One common model of clean speech is an auto-regression model that models a next point in a speech signal based on past points in the speech signal. In terms of an equation:

$$x_n = \sum_{m=1}^{p} a_m x_{n-m} + v_n \quad \text{EQ. 3}$$

where $x_n$ is the nth sample in the speech signal, $x_{n-m}$ is the n-mth sample in the speech signal, $a_m$ are auto-regression parameters based on a physical shape of a "lossless tube" model of a vocal tract and $v_n$ is a combination of an input excitation and a fitting error.

Because the auto-regression model parameters are based on a physical model rather than a statistical model, they lack a great deal of information concerning the actual content of speech. In particular, the physical model allows for a large number of sounds that simply are not heard in certain languages. Because of this, it is difficult to separate noise from clean speech using such a physical model.

Some prior art systems have generated statistical descriptions of speech that are based on AR parameters. Under these systems, frames of training speech are grouped into mixture components based on some criteria. AR parameters are then selected for each component so that the parameters properly describe the mean and variance of the speech frames associated with the respective mixture component.

Under many such systems, the coefficients of the AR model are selected during training and are not modified while the system is being used. In other words, the model coefficients are not adjusted based on the noisy signal received by the system. In addition, because the AR coefficients are fixed, they are treated as point values that are known with absolute certainty.

In another prior art system described in J. Lim, *All-Pole Modeling of Degraded Speech*, IEEE Transactions on Acoustics, Speech, and Signal Processing, Vol. ASSP-26, No. 3, June 1978, a time domain/frequency domain system is shown in which the AR coefficients are not fixed but instead are modified based on the noisy signal. Under the Lim system, an iteration is performed to alternately update the AR coefficients and then update the denoised signal values. However, even under Lim, the updates to the denoised signal values are based on point values for the AR coefficients that are assumed to be known with certainty.

In reality, the best AR coefficients are never known with certainty. As such, the prior art systems that determine the denoised signal values by using point values for the AR coefficients are less than ideal since they rely on an assumption that is not true.

Thus, a denoising system is needed that operates in the time domain or frequency domain, and that recognizes that parameters of a model description of speech can only be known with a limited amount of certainty. In addition, such a system needs to be computationally efficient.

SUMMARY OF THE INVENTION

A probability distribution for speech model parameters, such as auto-regression parameters, is used to identify a distribution of denoised values from a noisy signal. Under one embodiment, the probability distributions of the speech model parameters and the denoised values are adjusted to improve a variational inference so that the variational inference better approximates the joint probability of the speech model parameters and the denoised values given a noisy signal. In some embodiments, this improvement is performed during an expectation step in an expectation-maximization algorithm.

The statistical model can also be used to identify an average spectrum for the clean signal and this average spectrum may be provided to a speech recognizer instead of the estimate of the clean signal.

DETAILED DESCRIPTION OF ILLUSTRATIVE EMBODIMENTS

Figure 1:
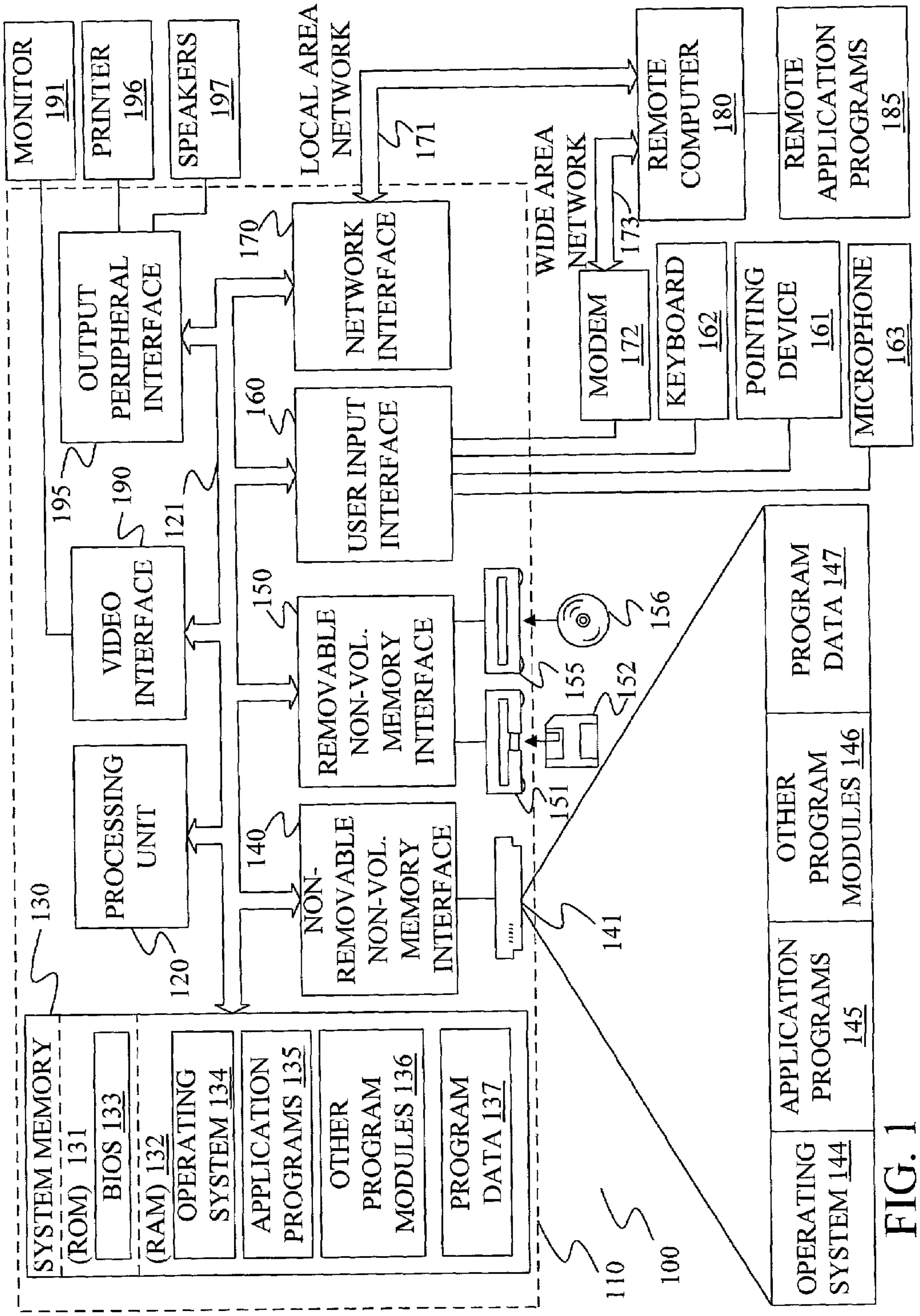
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
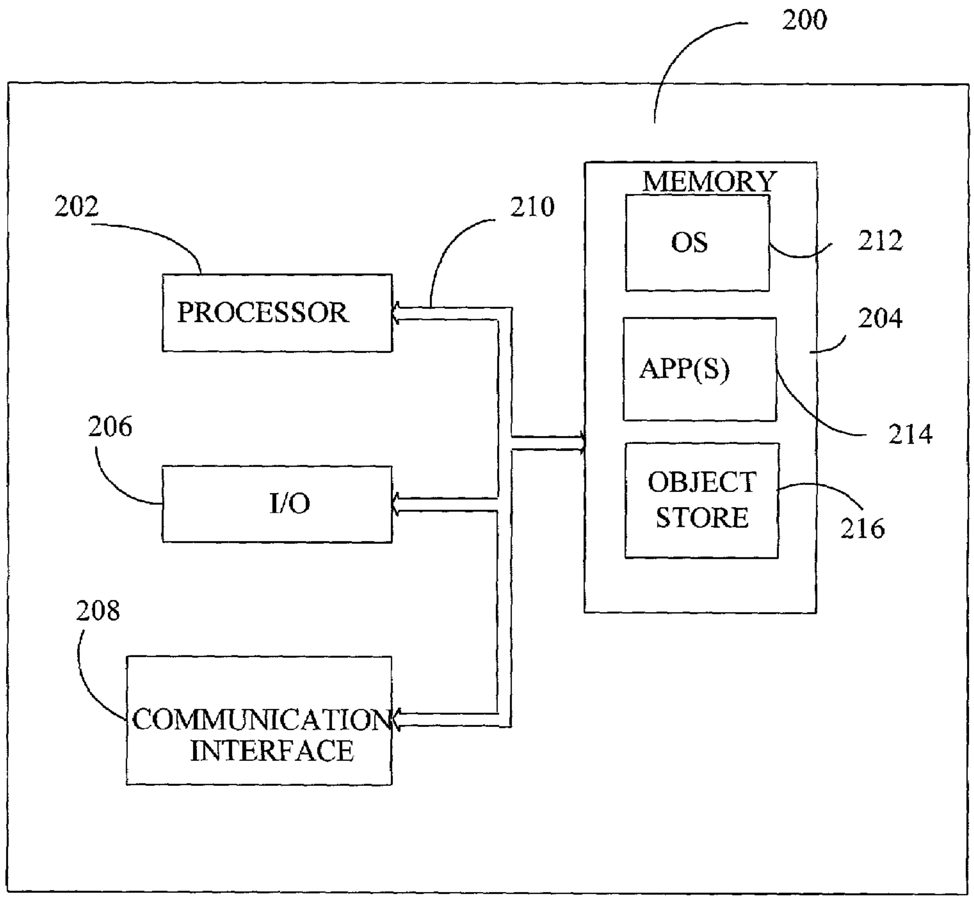
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
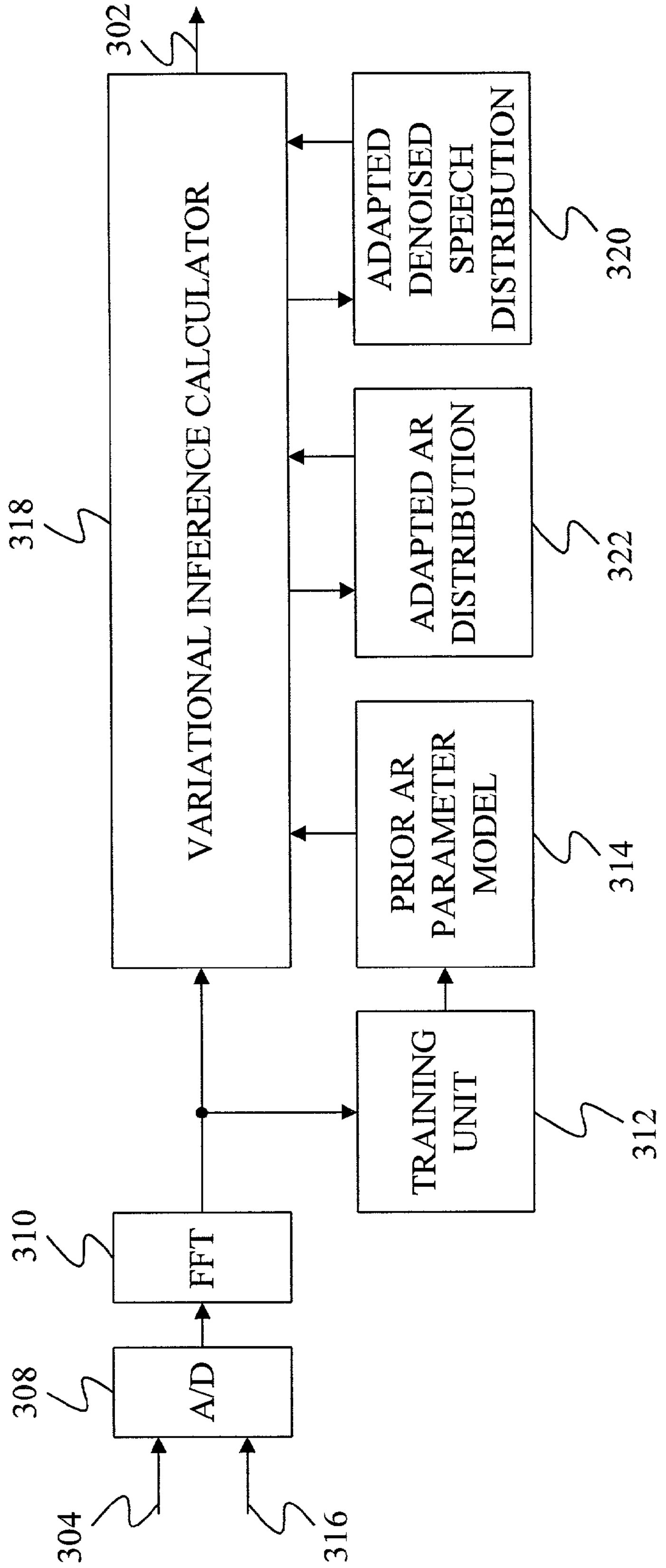
FIG. 3 is a block diagram of a denoising system of one embodiment of the present invention.

As shown in the block diagram of FIG. 3, the present invention provides a denoising system 300 that identifies a denoised signal 302 from a noisy signal 304 by generating a probability distribution for speech model parameters that describe the spectrum of a denoised signal, such as autoregression (AR) parameters, and using that distribution to determine a distribution of denoised values.

Under one embodiment of the present invention, the probability distribution for the speech model parameters, also referred to as spectrum parameters or distribution parameters, is a mixture of Normal-Gamma distributions for AR parameters. Under this embodiment, each mixture component, s, provides a probability of a set of AR parameters, θ, that is defined as:

$$p(\theta \mid s) \propto \exp\left(\frac{v}{2p}\sum_{k=0}^{p-1}|\mu_k^s \tilde{a}_k' - V_k^s|^2\right) \cdot v^{\frac{\alpha_s}{2}} \exp\left(-\frac{\beta_s}{2}v\right) \qquad \text{EQ. 4}$$

where $\mu_k^s$ is the mean of a normal distribution for a kth parameter, $V_k^s$ is a precision value for the kth parameter, $\alpha_s$ and $\beta_s$ are the shape and size parameters, respectively, of the Gamma contribution to the distribution, ν is the error associated with the AR model and $\tilde{a}'_k$ is defined as:

$$\tilde{a}_k' = 1 - \sum_{n=1}^{p} e^{-iw_k n} a_n \qquad \text{EQ. 5}$$

where $w_k$ is a frequency, and $a_n$ is the nth AR parameter.

Under one embodiment, the hyper parameters ($\mu_k^s$, $V_k^s$, $\alpha_s$, $\beta_s$) that describe the distribution for each mixture component are initially determined by a training unit 312 and appear as a prior AR parameter model 314.

Under one embodiment, training unit 312 receives frequency-domain values from a Fast Fourier Transform (FFT) unit 310 that describe frames of a clean signal 316. In one particular embodiment, FFT unit 310 generates frequency domain values that represent 16 msec overlapping frames that have been sampled by an analog-to-digital converter 308 at N=256 time points using a 16 kHz sampling rate. Under one embodiment, the clean signal is generated from 10000 sentences of the Wall Street Journal recorded with a close-talking microphone for 150 male and female speakers of North American English.

For each frame, training unit 312 identifies a set of AR parameters that best describe the signal in the frame. Under one embodiment, an auto-correlation technique is used to identify the proper AR parameters for each frame.

The resulting AR parameters are then clustered into mixture components. Under one embodiment, each frame's parameters are grouped into one of 256 mixture components.

One method for performing this clustering is to convert the AR parameters to the cepstral domain. This can be done by using the sample points that would be generated by the AR parameters to represent a pseudo-signal and then converting the pseudo-signal into cepstral coefficients. Once the cepstral coefficients are formed, they can be grouped using k-means clustering, which is a known technique for grouping cepstral coefficients. The resulting groupings are then translated onto the respective AR parameters that formed the cepstral coefficients.

Once the groupings have been formed, statistical parameters ($\mu_k^s$, $V_k^s$, $\alpha_s$, $\beta_s$) that describe the distribution for each mixture component are determined from the AR training parameters grouped in each component. Techniques for determining these values for a Normal-Gamma distribution given a data set are well known. The resulting statistical parameters are then stored as prior AR parameter model 314.

Once the prior parameter model has been generated, it can be used to identify denoised signals 302 from noisy signals 304. Ideally, this would be done by using the prior model and direct inference to determine a posterior probability that describes the likelihood of a particular clean signal, x, given a noisy signal, y. Such posterior probabilities are commonly calculated for simple models using the inference-based Bayes rule, which states:

$$p(x \mid y) = \frac{p(y \mid x)p(x)}{p(y)} \qquad \text{EQ. 6}$$

where p(x|y) is the posterior probability, p(y|x) is a likelihood that provides the probability of the noisy signal given the clean signal, and p(x) and p(y) are prior probabilities of the clean signal and noisy signal, respectively.

For the present invention, the posterior probability becomes p(s,θ,x|y), which is the joint probability of mixture component s, AR parameters θ, and denoised signal x given noisy signal y. However, attempting to calculate this value using exact inference becomes intractable because it results in a quartic term $\exp(x^2\theta^2)$.

Under one embodiment of the present invention, the intractability of calculating the exact posterior probability is overcome using variational inference. Under this technique, the posterior probability is replaced with an approximation that is then adapted so that the distance between the approximation and the actual posterior probability is minimized. In particular, the approximation, q(s,θ,x|y), to the posterior probability is adapted by maximizing an improvement function defined as:

$$F[q] = \sum_s \int dx d\theta q(s, \theta, x \mid y) \log \frac{p(s, \theta, x, y)}{q(s, \theta, x \mid y)} \qquad \text{EQ. 7}$$

where F[q] is the improvement function, q(s,θ,x|y) is the approximation to the posterior probability, and p(s,θ,x,y) is the joint probability of mixture component s, AR parameters θ, denoised signal x, and noisy signal y.

To limit the search space for the approximation to the posterior, the approximation is further defined as:

$$q(s,\theta,x|y) = q(s)q(\theta|s)q(x|s) \qquad \text{EQ. 8}$$

where q(s) is the probability of mixture component s, q(θ|s) is the probability of AR parameters θ given mixture component s, and q(x|s) is the probability of a clean signal x given mixture component s.

The approximation is updated by iterating between modifying the distributions that describe q(s) and q(θ|s), and modifying the distributions that describe q(x|s). To begin the iteration, prior AR parameter model 314 is used by a variational inference calculator 318 to initialize the statistical parameters associated with q(s) and q(θ|s). In particular, $\mu_k^s$, $V_k^s$, $\alpha_s$, $\beta_s$, which describe the distribution of prior AR parameter model p(θ|s), and $\pi_s$, which describes the weighting of the mixture components in the prior AR parameter model, are used to initialize q(θ|s) and q(s), respectively.

With the hyper parameters of the AR distribution initialized, a mean, $\rho_n^s$, and an N×N precision matrix, $\Lambda^s$, that describe q(x|s) are obtained as:

$$\rho_n^s = \frac{1}{N}\sum_{k=0}^{N-1} e^{iw_k n}\tilde{f}_k^s\tilde{y}_k \qquad \text{EQ. 9}$$

$$\Lambda_{nm}^s = \frac{1}{N}\sum_{k=0}^{N-1} e^{iw_k(n-m)}\tilde{g}_k^s \qquad \text{EQ. 10}$$

where $\rho_n^s$ is the mean of the nth time point in a frame of the denoised signal for mixture component s, $\Lambda_{nm}^s$, is the an entry in the precision matrix that provides the covariance of two values at time points n and m, N is the number of frequencies in the Fast Fourier Transform, $w_k$ is the kth frequency, $\tilde{y}_k$ is Fast Fourier Transform of a frame of the noisy signal at the kth frequency and $f_k^s$ and $\tilde{g}_k^s$ are defined as:

$$\tilde{f}_k^s = \frac{\lambda|\tilde{b}_k'|^2}{\tilde{g}_k^s} \qquad \text{EQ. 11}$$

$$\tilde{g}_k^s = \lambda|\tilde{b}'_k|^2 + E_s(v|\tilde{a}'_k|^2) \qquad \text{EQ. 12}$$

where $\tilde{b}'_k$ and $\lambda$ are AR parameters of an AR description of noise, $\tilde{a}'_k$ is the frequency domain representation of the AR parameters for the clean signal as defined in EQ. 5 above, and $E_s(\,)$ denotes averaging with respect to the distribution of AR parameters $q(\theta|s)$.

The result of equations 9–12 produces an adapted distribution for denoised speech 320 in FIG. 3. Adapted denoised speech distribution 320 is then used by variational inference calculator 318 to update the hyper parameters that describe the distribution of $q(\theta|s)$ through:

$$V_s = R_s + V_s \qquad \text{EQ. 13}$$

$$\mu_s = V_s^{-1}(r_s + V_s\mu_s) \qquad \text{EQ. 14}$$

$$\alpha_s = N + p + \alpha_s \qquad \text{EQ. 15}$$

$$\hat{\beta}_s = \frac{1}{N}\sum_k |\tilde{a}_{k'}|^2 E_s|\tilde{x}_k|^2 + \frac{1}{p}\sum_{k'} \left|\tilde{\xi}_{sk'}\tilde{a}_{k'} - \tilde{\eta}_{sk'}\right|^2 + \beta_s \qquad \text{EQ. 16}$$

$$\hat{\pi}_s = -\frac{\lambda}{2N}\sum_k |\tilde{b}_{k'}|^2 E_s|\tilde{y}_k - \tilde{x}_k|^2 - \frac{\upsilon}{2N}\sum_k |\tilde{a}_{k'}|^2 E_s|\tilde{x}_k|^2 - \frac{\upsilon}{2p}\sum_{k'} \left|\tilde{\xi}_{sk'}\tilde{a}_{k'} - \tilde{\eta}_{sk'}\right|^2 + \frac{N+p}{2}\log\upsilon - \sum_k \log\tilde{g}_{sk} \qquad \text{EQ. 17}$$

where $\mu_s$ and $V_s$ are the mean matrix and precision matrix for the sth mixture component in the previous version of the distribution, $\alpha_s$, $\beta_s$, and $\pi_s$ are the shape parameter, size parameter, and weighting value of the sth mixture component in the previous version of the distribution, $\mu_s$ and $V_s$ are the updated mean matrix and precision matrix, $\alpha_s$, $\beta_s$, and $\pi_s$ are the updated shape parameter, size parameter, and weighting value, $a=\mu_s$, $\upsilon=\alpha_s/\beta_s$, the subscript k refers to N-point FFT, the subscript k' refers to a p-point FFT, $\tilde{g}_{sk}$ is defined in equation 12 above, $\xi_s$ and $\eta_s$ represent $\mu_n^s$ and $V_{nm}^s$, and $R_s$ and $r_s$ are matrices that have entries defined at row n and column m as:

$$R_{n,m}^s = \frac{1}{N}\sum_{k=0}^{N-1} e^{iw_k(n-m)}E_s(|\tilde{x}_k|^2) \qquad \text{EQ. 18}$$

$$r_n^s = R_{n,0}^s \qquad \text{EQ. 19}$$

such that $$\hat{V}_{n,m}^s = V_{n,m}^s + \frac{1}{N}\sum_{k=0}^{N-1} e^{iw_k(n-m)}E_s(|\tilde{x}_k|^2) \qquad \text{EQ. 20}$$

$$\hat{\mu}_n^s = \hat{V}_{s,n}^{-1}\left(\frac{1}{N}\sum_{k=0}^{N-1} e^{iw_k(n)} + V_{s,n}\mu_n^s\right) \qquad \text{EQ. 21}$$

where $V_n^s$ represents the nth row in the precision matrix and $E_s(\,)$ indicates averaging with respect to $q(x|s)$, which is defined as:

$$E_s|\tilde{x}_k|^2 = |\tilde{\rho}_k|^2 + \frac{N}{\tilde{g}_{sk}} \qquad \text{EQ. 22}$$

$$E_s|\tilde{y}_k - \tilde{x}_k|^2 = |\tilde{y}_k - \tilde{\rho}_k|^2 + \frac{N}{\tilde{g}_{sk}} \qquad \text{EQ. 23}$$

The updates to the AR parameter distribution result in an adapted AR distribution model 322. The distributions for the AR parameters and the denoised values continue to be adapted in an alternating fashion until the adapted distributions converge on final values. At this point, denoised speech values for time points, n, in the frame can be determined as:

$$\hat{x}_n = \sum_s \hat{\pi}_s\rho_n^s \qquad \text{EQ. 24}$$

Under one embodiment of the present invention, the variational inference technique described above forms an E-step in an Expectation-Maximization (EM) algorithm. Under the E-step of a typical EM algorithm, a distribution for a hidden variable is determined, wherein a hidden variable is a variable that cannot be observed directly. Under the present invention, the variational inference is used in the E-step to allow distributions for two different hidden variables to be determined while maintaining the dependence of the two variables to each other.

In particular, by using variational inference, embodiments of the present invention are able to determine a distribution for the AR parameters and a distribution for the denoised values, without assuming that the parameters and the values are independent of each other. The results of this variational inference are a set of distributions for the AR parameters and the denoised values that represent the relationship between the parameters and the denoised values.

In some embodiments, the E-step determination of the distributions for the AR parameters and the denoised values is followed by a maximization step (M-step) in which model parameters used in the E-step are updated based on the distributions for the hidden variables. In particular, the AR parameters, $\tilde{b}_k'$ and $\lambda$, that described a noise model are updated based on the distribution using the following update equations:

$$b=Q^{-1}q \quad \text{EQ. 25}$$

$$\lambda = \left( \frac{1}{N^2} \sum_k |\tilde{b}_{k'}|^2 E|\tilde{y}_k - \tilde{x}_k|^2 \right)^{-1} \quad \text{EQ. 26}$$

where b and Q are matrices, with the entries in Q defined as:

$$Q_{nm} = \frac{1}{N} \sum_k e^{i\omega_k (n-m)} E|\tilde{y}_k - \tilde{x}_k|^2 \quad \text{EQ. 27}$$

and where q is a vector defined as $q_n=Q_{n0}$ and E denotes averaging with respect to q(x) and is given by:

$$E|\tilde{y}_k - \tilde{x}_k|^2 = \sum_s \hat{\pi}_s E_s |\tilde{y}_k - \tilde{x}_k|^2 \quad \text{EQ. 28}$$

The M-step can also be used to update a set of filter coefficients, h, that describes the effects of reverberation on the clean signal. In particular, with reverberation taken into consideration, the relationship between a noisy signal sample, $y_n$, and a set of clean signal samples, $x_n$, becomes:

$$y_n = \sum_m h_m x_{n-m} + u_n \quad \text{EQ. 29}$$

where $h_m$ is an impulse filter response and $u_n$ is additive noise.

In embodiments that apply an M-step, the E-step and the M-step are iteratively repeated until the distributions for the estimate of the denoised values converge. Thus, a nested iteration is provided with an outer EM iteration and an inner iteration associated with the variational inference of the E-step.

By using a distribution of possible AR parameters instead of point values to determine the distribution of denoised values, the present invention provides a more accurate distribution for the denoised values. In addition, by utilizing variational inference, the present invention is able to improve the efficiency of identifying an estimate of a denoised signal.

Figure 4:
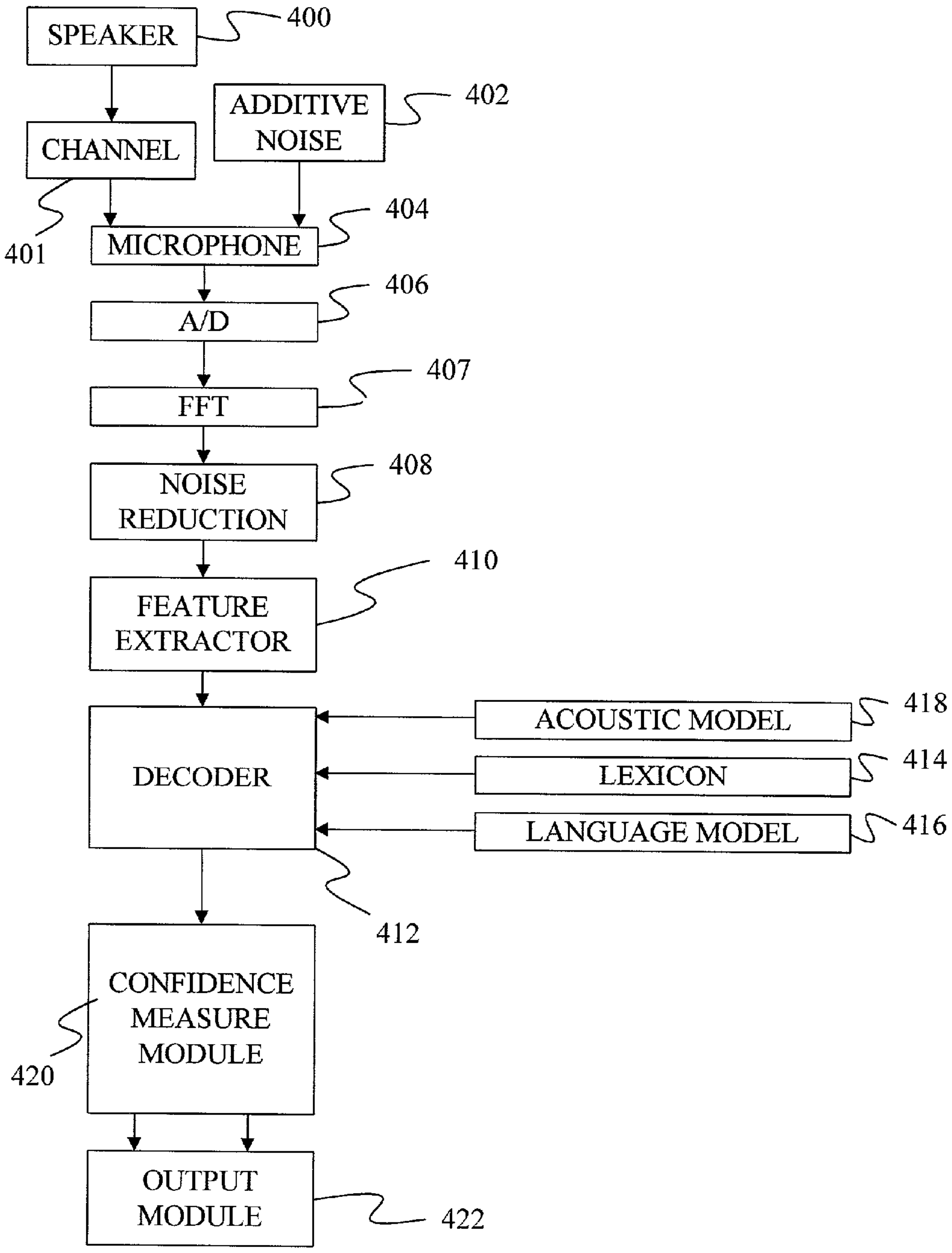
FIG. 4 is a block diagram of a speech recognition system in which embodiments of the present invention may be practiced.

FIG. 4 provides a block diagram of hardware components and program modules found in the general computing environments of FIGS. 1 and 2 that are particularly relevant to an embodiment of the present invention used for speech recognition. In FIG. 4, an input speech signal from a speaker 400 pass through a channel 401 and together with additive noise 402 is converted into an electrical signal by a microphone 404, which is connected to an analog-to-digital (A-to-D) converter 406.

A-to-D converter 406 converts the analog signal from microphone 404 into a series of digital values. In several embodiments, A-to-D converter 406 samples the analog signal at 16 kHz and 16 bits per sample, thereby creating 32 kilobytes of speech data per second.

The output of A-to-D converter 406 is provided to a Fast Fourier Transform 407, which converts 16 msec overlapping frames of the time-domain samples into frames of frequency-domain values. These frequency domain values are then provided to a noise reduction unit 408, which generates a frequency-domain estimate of a clean speech signal using the techniques described above.

Under one embodiment, the frequency-domain estimate of the clean speech signal is provided to a feature extractor 410, which extracts a feature from the frequency-domain values. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

Under other embodiments, noise reduction unit 408 identifies an average spectrum for a clean speech signal instead of an estimate of the clean speech signal. To determine the average spectrum, $\{\hat{S}_k\}$, equation 24 is modified to:

$$\{\hat{S}\}_k = \sum_s \hat{\pi}_s \left( |\rho_{s,k}|^2 + \frac{N}{g_{k,s}} \right) \quad \text{EQ. 30}$$

where g is defined in equation 12, $\{\hat{S}_k\}$ is the estimate of $|x_k|^2$, i.e. the mean spectrum of the frame, and $\rho_{s,k}$ is defined as:

$$\rho_{s,k}=f_k^s \tilde{y}_k \quad \text{EQ. 31}$$

where $f_k^s$ is defined in equation 11 above and $\tilde{y}_k$ is the kth frequency component of the current noisy signal frame.

The average spectrum is provided to feature extractor 410, which extracts a feature value from the average spectrum. Note that the average spectrum of EQ. 21 is a different value than the square of the estimate of a denoised value. As a result, the feature values derived from the average spectrum are different from the feature values derived from the estimate of the denoised signal. Under some applications, the present inventors believe the feature values from the average spectrum produce better speech recognition results.

The feature vectors produced by feature extractor 410 are provided to a decoder 412, which identifies a most likely sequence of words based on the stream of feature vectors, a lexicon 414, a language model 416, and an acoustic model 418.

In some embodiments, acoustic model 418 is a Hidden Markov Model consisting of a set of hidden states. Each linguistic unit represented by the model consists of a subset of these states. For example, in one embodiment, each phoneme is constructed of three interconnected states. Each state has an associated set of probability distributions that in combination allow efficient computation of the likelihoods against any arbitrary sequence of input feature vectors for each sequence of linguistic units (such as words). The model also includes probabilities for transitioning between two neighboring model states as well as allowed transitions between states for particular linguistic units. By selecting the states that provide the highest combination of matching probabilities and transition probabilities for the input feature vectors, the model is able to assign linguistic units to the speech. For example, if a phoneme was constructed of states 0, 1 and 2 and if the first three frames of speech matched state 0, the next two matched state 1 and the next three matched state 2, the model would assign the phoneme to these eight frames of speech.

Note that the size of the linguistic units can be different for different embodiments of the present invention. For example, the linguistic units may be senones, phonemes, noise phones, diphones, triphones, or other possibilities.

In other embodiments, acoustic model 418 is a segment model that indicates how likely it is that a sequence of feature vectors would be produced by a segment of a particular duration. The segment model differs from the frame-based model because it uses multiple feature vectors at the same time to make a determination about the likelihood of a particular segment. Because of this, it provides a better model of large-scale transitions in the speech signal. In addition, the segment model looks at multiple durations for each segment and determines a separate probability for each duration. As such, it provides a more accurate model for segments that have longer durations. Several types of segment models may be used with the present invention including probabilistic-trajectory segmental Hidden Markov Models.

Language model 416 provides a set of likelihoods that a particular sequence of words will appear in the language of interest. In many embodiments, the language model is based on a text database such as the North American Business News (NAB), which is described in greater detail in a publication entitled CSR-III Text Language Model, University of Penn., 1994. The language model may be a context-free grammar or a statistical N-gram model such as a trigram. In one embodiment, the language model is a compact trigram model that determines the probability of a sequence of words based on the combined probabilities of three-word segments of the sequence.

Based on the acoustic model, the language model, and the lexicon, decoder 412 identifies a most likely sequence of words from all possible word sequences. The particular method used for decoding is not important to the present invention and any of several known methods for decoding may be used.

The most probable sequence of hypothesis words is provided to a confidence measure module 420. Confidence measure module 420 identifies which words are most likely to have been improperly identified by the speech recognizer, based in part on a secondary frame-based acoustic model. Confidence measure module 420 then provides the sequence of hypothesis words to an output module 422 along with identifiers indicating which words may have been improperly identified. Those skilled in the art will recognize that confidence measure module 420 is not necessary for the practice of the present invention.

Although the present invention has been described with reference to AR parameters, the invention is not limited to auto-regression models. Those skilled in the art will recognize that in the embodiments above, the AR parameters are used to model the spectrum of a denoised signal and that other parametric descriptions of the spectrum may be used in place of the AR parameters. For example, one may simply use the spectra themselves, $S_k$ for frequency k, as parameters. This means replacing $\nu|\tilde{a}'_k|$ in the equations above with $1/S_k$ and determining a distribution over the $S_k$, e.g. a Gamma distribution for each k.

In addition, although the present invention has been described with reference to a computer system, it may also be used within the context of hearing aids to remove noise in the speech signal before the speech signal is amplified for the user.

Although the present invention has been described with reference to preferred embodiments, workers skilled in the art will recognize that changes may be made in form and detail without departing from the spirit and scope of the invention.

What is claimed is:

1. A method of removing noise in a noisy signal, the method comprising:

defining a probability distribution for denoised values in terms of a set of distribution parameters;

determining a probability distribution for the distribution parameters; and averaging a value with respect to the probability distribution for the distribution parameters to identify an estimate of a value related to a denoised signal from the noisy signal.

2. The method of claim 1 wherein the set of distribution parameters comprise auto-regression coefficients.

3. The method of claim 1 wherein determining a probability distribution comprises determining a Normal-Gamma distribution.

4. The method of claim 1 wherein determining a probability distribution comprises determining a probability distribution for each of a set of mixture components.

5. The method of claim 4 wherein determining a probability distribution further comprises determining a Normal-Gamma distribution for each mixture component.

6. The method of claim 1 wherein using the probability distribution comprises using the probability distribution as part of a variational inference.

7. The method of claim 1 further comprising producing a modified probability distribution for the denoised values by modifying the probability distribution for the denoised values based on the noisy signal and the probability distribution for the distribution parameters.

8. The method of claim 7 further comprising modifying the probability distribution for the distribution parameters based on the modified probability distribution for the denoised values.

9. The method of claim 8 wherein modifying the probability distribution for the denoised values comprises modifying the probability distribution for the denoised values in order to improve a variational inference.

10. The method of claim 9 wherein modifying the probability distribution of the distribution parameters and the probability distribution of the denoised values comprises iterating between modifying the probability distribution of the distribution parameters and modifying the probability distribution of the denoised values.

11. The method of claim 10 wherein iterating between modifying the probability distribution of the distribution parameters and modifying the probability distribution of the denoised values forms an expectation step in an expectation-maximization algorithm.

12. The method of claim 11 wherein the expectation-maximization algorithm further comprises a maximization step in which a model for noise signals is adjusted based on the probability distribution for the distribution parameters and the probability distribution for the denoised values.

13. The method of claim 1 wherein identifying an estimate of a value related to a denoised signal comprises identifying an estimate of a spectrum of a denoised signal.

14. The method of claim 13 further comprising providing the estimate of the spectrum to a feature extractor to identify at least one feature value from the spectrum.

15. The method of claim 14 wherein the feature value is used to identify at least one word represented by the noisy signal.

16. A computer-readable medium having computer-executable instructions for performing steps comprising:

identifying a probability distribution of spectrum parameters that describe a probability distribution for a denoised value; and averaging a value with respect to the probability distribution of the spectrum parameters to identify an estimate of a denoised value from a noisy signal.

17. The computer-readable medium of claim 16 wherein the spectrum parameters comprise auto-regression parameters.

18. The computer-readable medium of claim 16 wherein the probability distribution of the spectrum parameters is a normal-gamma distribution.

19. The computer-readable medium of claim 16 wherein using the probability distribution of the spectrum parameters to identify an estimate of a denoised value comprises using the probability distribution of the spectrum parameters in a variational inference.

20. The computer-readable medium of claim 19 wherein using the probability distribution of the spectrum parameters in a variational inference comprises improving the variational inference using an expectation step in an expectation-maximization algorithm.

21. A method of improving a variational inference, the method comprising:

defining an improvement function that produces a value and is based in part on the variational inference;

adjusting a distribution of a first hidden variable to increase the value of the improvement function, wherein the variational inference is based in part on the distribution of the first hidden variable; and adjusting a separate distribution of a second hidden variable to increase the value of the improvement function, wherein the variational inference is further based in part on the distribution of the second hidden variable.

22. The method of claim 21 wherein the first hidden variable and the second hidden variable are at least partially dependent on each other.

23. The method of claim 21 wherein adjusting the distributions of the first hidden variable and second hidden variable forms an expectation step in an expectation maximization algorithm.

24. The method of claim 23 further comprising iteratively adjusting the distributions of the first hidden variable and the second hidden variable.

25. The method of claim 24 further comprising a maximization step in which a model parameter is altered based on the distribution of the first hidden variable and the distribution of the second hidden variable.

26. The method of claim 21 wherein the first hidden variable is a set of speech model parameters that describe a spectral content of a denoised signal.

27. The method of claim 26 wherein the first hidden variable is a set of auto-regression parameters.

28. The method of claim 26 wherein the second hidden variable is a denoised signal value.

29. The method of claim 28 wherein the denoised signal value is a frequency-domain value.

30. A computer-readable medium having computer-executable components for performing steps comprising:

adjusting a distribution for a first set of variables based on a function associated with a variational inference and a distribution of a second set of variables to form an adjusted distribution for the first set of variable; and adjusting the distribution of the second set of variables based on the function and the adjusted distribution for the first set of variables.

31. The computer-readable medium of claim 30 wherein the function indicates when the variational inference is improved.

32. The computer-readable medium of claim 30 wherein the first set of variables are model parameters.

33. The computer-readable medium of claim 32 wherein the model parameters are auto-regression parameters.

34. The computer-readable medium of claim 33 wherein the second set of variables are denoised signal values.

35. The computer-readable medium of claim 30 wherein adjusting the distribution for the first set of variables and adjusting the distribution for the second set of variables form an expectation step.

36. The computer-readable medium of claim 35 wherein the expectation step is part of an expectation-maximization algorithm that further comprises a maximization step in which a noise model is adjusted.

* * * * *

UNITED STATES PATENT AND TRADEMARK OFFICE

CERTIFICATE OF CORRECTION

PATENT NO. : 6,990,447 B2
APPLICATION NO. : 09/999576
DATED : January 24, 2006
INVENTOR(S) : Hagai Attias et al.

It is certified that error appears in the above-identified patent and that said Letters Patent is hereby corrected as shown below:

On the face page, in field (73), in “Assignee”, in column 1, line 1, delete “Corportion,” and insert -- Corporation --, therefor.

On page 2, in field (73), under “Other Publications”, in column 1, line 22, before “36(4):471-476 (1988).” delete “Proccssing” and insert -- Processing --, therefor.

On page 2, in field (73), under “Other Publications”, in column 1, line 24, after “Pittsburgh,” delete “9,”.

On page 2, in field (73), under “Other Publications”, in column 1, line 27, delete “(updated).” and insert -- (undated). --, therefor.

On page 2, in field (73), under “Other Publications”, in column 2, line 8, delete “(updated).” and insert -- (undated). --, therefor.

In column 9, line 25, delete “ $\tilde{g}_k^s=\lambda|\tilde{b}'_k|^2+E_s(v|\tilde{a}'_k|^2)$EQ. 12 ” and insert -- $\tilde{g}_k^s = \lambda\left|\tilde{b}'_k\right|^2 + E_s\left(v\left|\tilde{a}'_k\right|^2\right)$ EQ. 12 --.

Signed and Sealed this

Twenty-fifth Day of August, 2009

David J. Kappos
*Director of the United States Patent and Trademark Office*